Dec. 12, 1961  J. J. RUSSELL  3,012,582
MIXING VALVE
Filed June 22, 1959
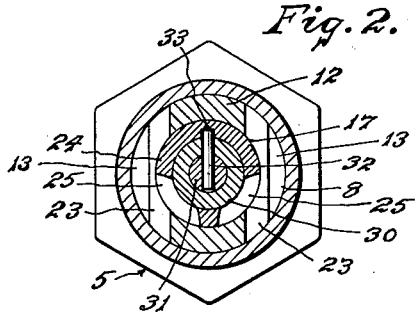
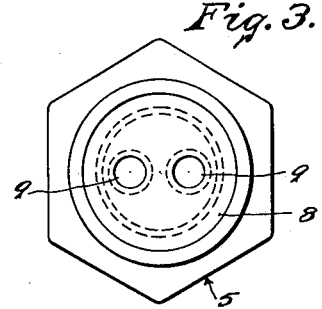
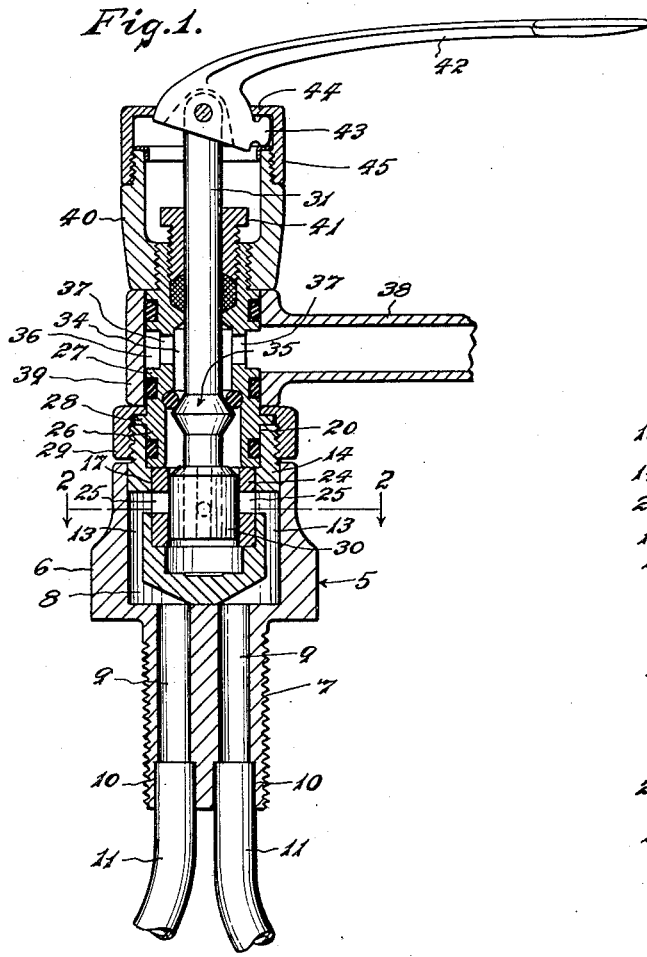
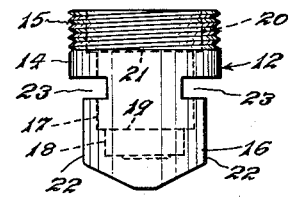
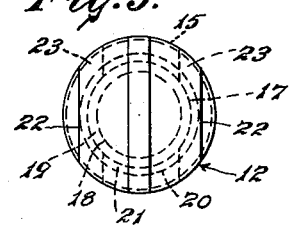
INVENTOR.
JOHN J. RUSSELL
BY Louis V. Lucia
ATTORNEY.

3,012,582
MIXING VALVE
John J. Russell, Westbury, N.Y., assignor to Vance Industries, Inc., Chicago, Ill., a corporation of Delaware
Filed June 22, 1959, Ser. No. 822,053
3 Claims. (Cl. 137—625.17)

This invention relates to a mixing valve and more particularly to the type of a mixing valve which is controlled by the manual operation of a single handle.

Mixing valves as heretofore constructed have had a base member with separate connections for hot and cold water which have required the use of two holes in a sink or washbasin to which such mixing valves are mounted. Also, the installation of such valves has been complicated and required a considerable amount of labor.

An object of this invention, therefore, is to provide a mixing valve, particularly of the single handle type, which can be mounted in a single hole and with a minimum of labor.

A further object of this invention is the provision of such a valve having a base with a single threaded stem and a pair of separate passages extending through said stem connecting the valve to sources of hot and cold water.

A still further object of the present invention is the provision of a base for such valves of an improved construction which greatly facilitates the manufacture and reduces the cost of said valve.

A further object is the provision of a novel and improved construction for such a valve.

Further objects and advantages of the present invention will be more clearly understood from the following description and from the accompanying drawing in which:

FIG. 1 is a sectional side view of a mixing valve embodying the present invention.

FIG. 2 is a sectional plan view on line 2—2 of FIG. 1.

FIG. 3 is a plan view of the base member with the dividing plug member removed therefrom.

FIG. 4 is a side view of said dividing plug member.

FIG. 5 is a bottom view thereof.

As illustrated in the drawing, my improved mixing valve includes a base member 5 having a body portion 6 with a mounting stem 7 extending downwardly therefrom and threaded to receive suitable nuts for securing the base to a conventional sink or washbasin having a hole through which said stem 7 extends.

The said body portion 6 of the base has an axial recess 8 therein and the stem 7 has a pair of passages 9—9 extending lengthwise therethrough and communicating with said recess 8. The lower end of said passages 9—9 are preferably enlarged at 10—10 to provide sockets for receiving the ends of tubes 11—11 which supply hot and cold water to the recess 6.

A dividing plug 12 is fitted into the recess 8 to divide said recess for providing separate passages 13—13 communicating with the hot and cold water passages 9—9. Said plug has a head portion 14, which is threaded at 15, and a dividing portion 16. The interior of said plug is provided with an axial recess 17 having a reduced portion 18 providing an annular shoulder 19 and an enlarged portion 20 providing an annular shoulder 21.

The exterior of said dividing plug is flattened at opposite sides thereof to provide opposed flat portions 22—22 and has connecting slots 23—23 which extend through the opposite sides of said plug and provide parts that communicate with the recess 17.

The outer diameter of said dividing plug is such that it fits snugly within the recess 8 and it is secured in said recess, in the position shown in FIG. 1, by suitable means, such as by being sweated to the base 5 to provide a watertight seal between the passages 13—13 and 9—9 for separating the flow of hot and cold water from the tubes 11—11 to the valve recess 17. It will be noted that the threaded portion 15 of the head of said dividing plug extends above the top of the base 5 for the purpose to be hereinafter described.

Within the recess 17 there is rotatably mounted a valve sleeve 24 which has parts 25—25 in register with the slots 23—23 and is positioned by means of an annular extension 26 on a supporting plug 27 that is fitted within the enlarged portion of the recess 17 and rotatably retains the sleeve 24 against axial movement in said bore. The plug 27 has an annular flange 28 which is engaged by a retaining nut 29 that is threaded to the said threaded portion 15 of the dividing plug for securely mounting the supporting plug 27.

A valve piston 30 is slidably contained within the sleeve 24 and is connected to an operating stem 31 which slidably extends through the supporting plug 27; the said stem being secured to the piston 30 by means of a pin 32 which projects through a side of the piston and extends into a slot 33 in the inner wall of the sleeve 24 for slidably connecting the piston to said sleeve and causing rotation of said sleeve with the piston upon rotation of the stem 31. The supporting plug 27 has an axial bore 34, which provides a water passage therein, and an annular shoulder providing a valve 35 which is controlled by an enlarged valve portion on the stem 31 for closing said passage upon vertical movement of said stem. An annular groove 36 is provided exteriorly of the plug 27 and communicates with the bore 34 through radial ports 37 which communicate with a faucet member 38 that has a hub 39 by means of which said faucet member is swivelly mounted about the supporting plug 27.

A recessed nut 40 is threaded to the upper portion of said plug 27 to swivelly retain the faucet member in position and said nut has a recess which contains a packing gland 41 that is threaded to said plug and prevents leakage from the bore 34 past the stem 31.

An operating handle 42 is pivotally secured to the upper end of said stem 31 and has a fulcruming projection 43 which rests upon the annular wall of said nut 40 and against the bottom of the flange 44 of a cap nut 45 for fulcruming said lever to raise and lower the stem 31.

In the operation of my mixing valve, when the handle 42 is raised it will lower the stem 31, thereby opening the valve 35 and lowering the piston 30 so as to also open the valve slots 25—25. This will permit water to enter into the interior of the valve sleeve 24 and then pass through the passage 34 and the ports 37 into the faucet 38. When the handle 42 is rotated, it will rotate the sleeve 24 and thereby adjust the ports 25—25 thereof to proportion the amount of hot and cold water which is allowed to pass through said ports to produce a flow of water from the faucet 38 of the desired temperature.

It will be understood from the above description that the particular construction of the mixing valve provided by my invention is of great advantage in the manufacture thereof since the base 5 and the dividing plug 12 can be produced on a screw machine; thereby eliminating the necessity of cored castings and providing a valve which is economical to manufacture and more accurate in dimensions as well as more durable and trouble-free.

I claim:

1. A mixing valve including a base having an axial recess and a mounting stem extending therefrom, said stem having a pair of spaced passages therein communicating with said recess, a dividing plug contained within said recess and having a head portion closing the top of the recess and a lower portion with opposed sides spaced from the walls of the recess to provide separate passages at opposite sides of said plug communicating with the passages in the stem, the said dividing plug having a recess therein and ports in opposite sides thereof communicating said recess in the plug with said separate passages, a valve sleeve rotatable in said recess in the plug and having ports communicating with said ports, a supporting plug mounted upon said dividing plug and having an extension rotatably retaining said valve sleeve against longitudinal movement within the dividing plug, an axial passage in said supporting plug communicating with the interior of said valve sleeve, a piston slidable in said valve sleeve for controlling the flow of water through the ports thereof, and an operating stem connected to said piston for axial movement thereof and to said valve sleeve for rotation thereof to control the proportion of hot and cold water through said valve and the volume of mixed water.

2. A mixing valve including a base having a body portion with an axial recess therein and a mounting stem extending from said base, said stem having a pair of spaced passages extending lengthwise therethrough and communicating with said axial recess, a dividing plug contained within said recess and having a head portion closing the top of said recess and a body portion disposed between said passages in the stem, said body portion having side portions thereof cut away to provide separate passages between the wall of the axial recess in the base and said side portions communicating with the passages in the stem, the said dividing plug having an extension projecting above the base, and a supporting plug secured to said extension.

3. A mixing valve including a base having a single stem depending therefrom, a recess in said base and a pair of spaced passages extending lengthwise through said stem and communicating with said recess in the base, a dividing plug fitting snugly within said recess and having a head portion closing the upper end thereof and body portions spaced from the walls of said recess and disposed between said passages in the stem to provide separate passages at opposite sides of said recess communicating with said passages in the stem, the said body portion of the dividing plug having an axial recess therein with slots in opposite sides thereof communicating with said recess in the base, and a supporting plug mounted upon said dividing plug and having a projection fitted within said dividing plug.

References Cited in the file of this patent

UNITED STATES PATENTS

| | | |
|---|---|---|
| 2,818,878 | Russell | Jan. 7, 1958 |
| 2,887,128 | Bloomberg | May 19, 1959 |
| 2,890,719 | Moen | June 16, 1959 |